July 14, 1970   J. F. RUETH   3,520,355
AIR CONDITONING APPARATUS FOR A RAILWAY PASSENGER VEHICLE
Filed Oct. 18, 1968   2 Sheets-Sheet 1
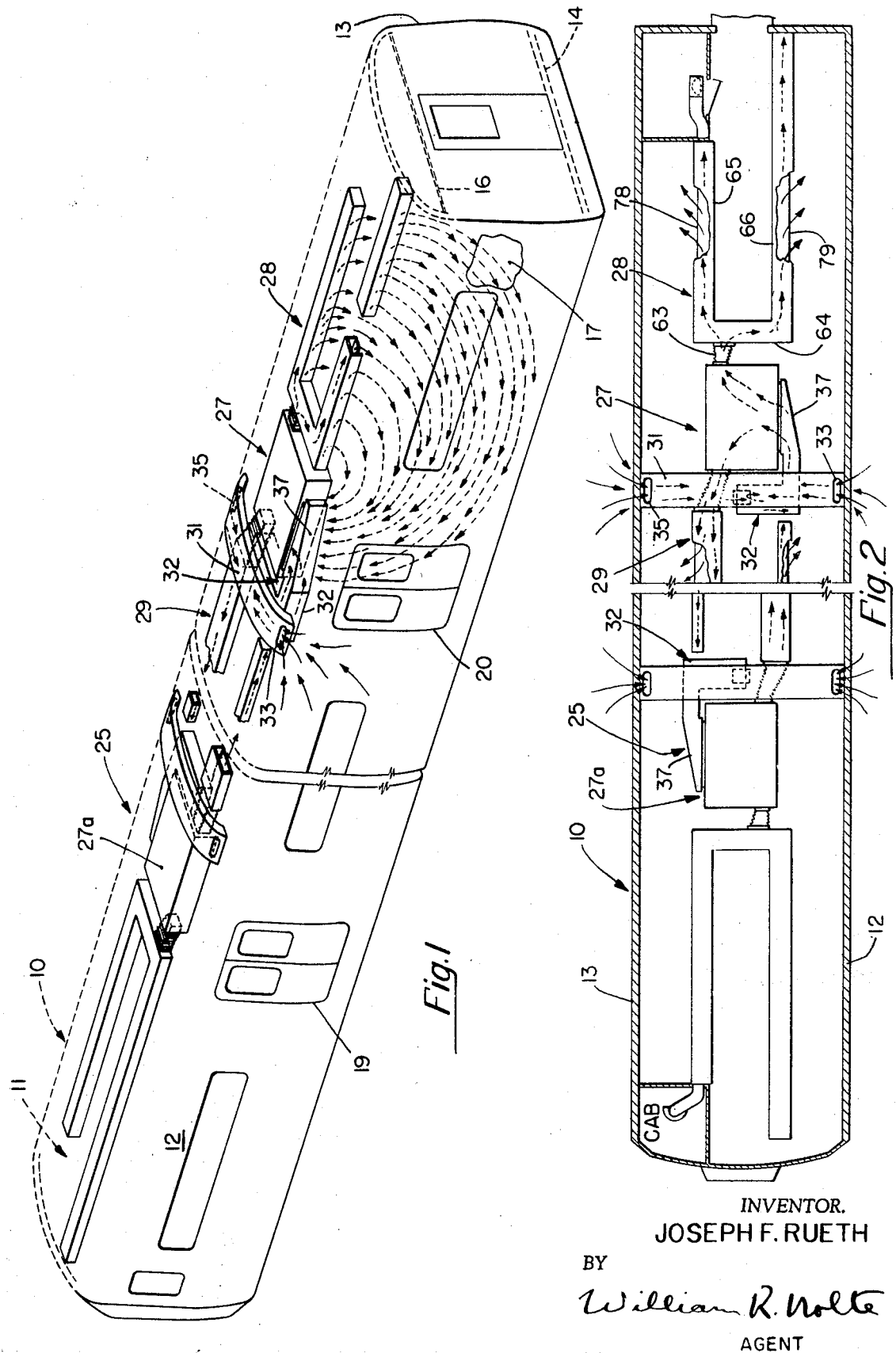
INVENTOR.
JOSEPH F. RUETH
BY
William R. Nolte
AGENT

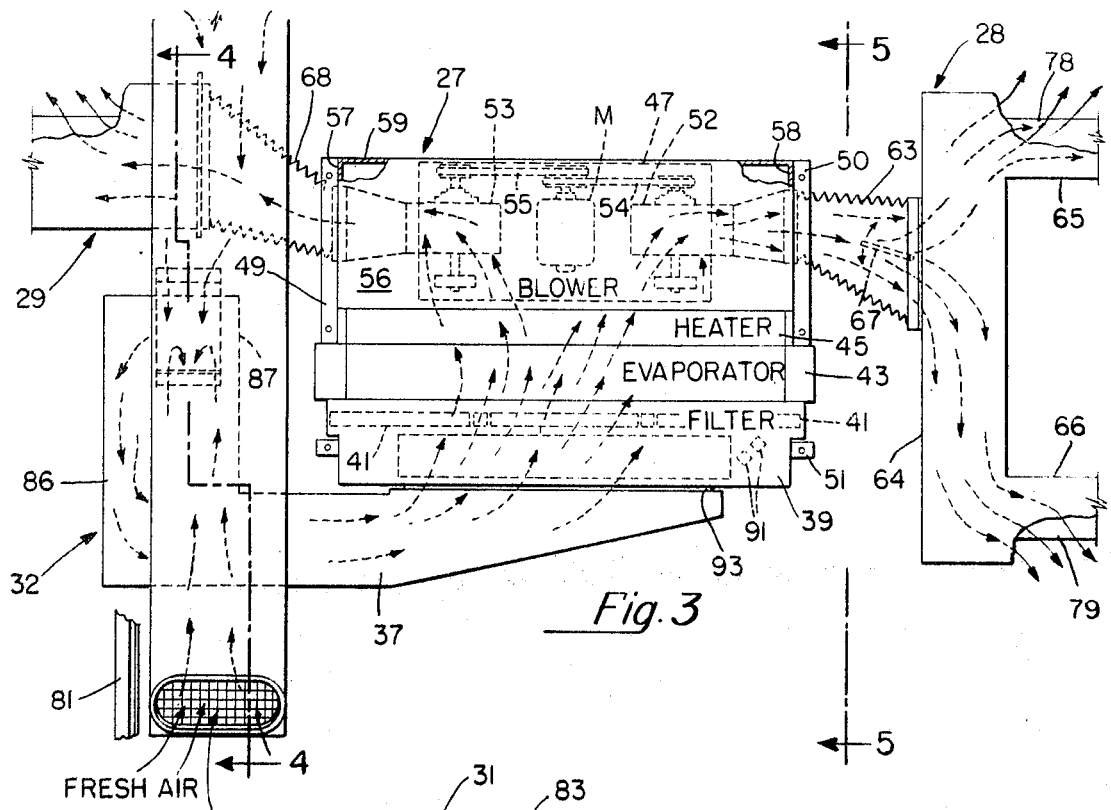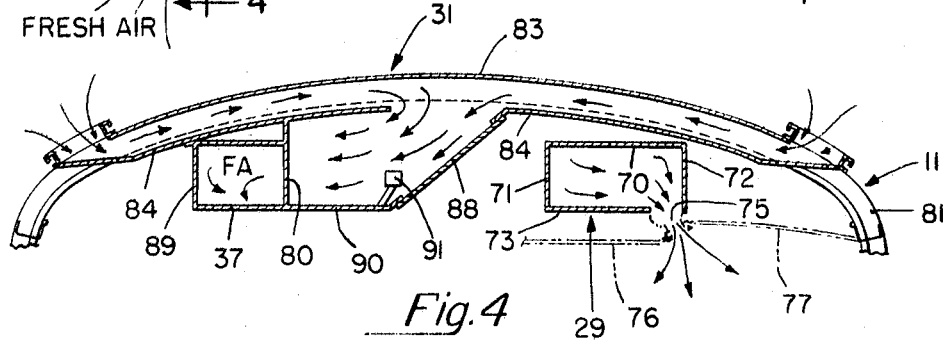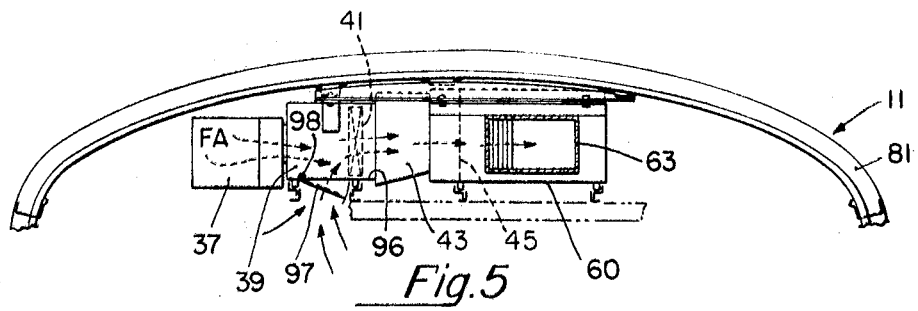

United States Patent Office 3,520,355
Patented July 14, 1970

3,520,355
AIR CONDITIONING APPARATUS FOR A
RAILWAY PASSENGER VEHICLE
Joseph F. Rueth, Warminster, Pa., assignor to The Budd
Company, Philadelphia, Pa., a corporation of Pennsylvania
Filed Oct. 18, 1968, Ser. No. 768,630
Int. Cl. B60h 3/00
U.S. Cl. 165—42　　　　　　　　　　　　　　　1 Claim

ABSTRACT OF THE DISCLOSURE

Overhead air conditioning apparatus for a railway passenger vehicle. The apparatus includes dual opposed centrifugal blowers connected to ducting which extends in opposite directions along the vehicle. The air is thus distributed from the apparatus to move in two directions simultaneously without the need for U-turn ducting.

---

This invention relates to air conditioning apparatus adapted to be used in a passenger carrying vehicle. Air conditioning apparatus of this type is sometimes carried beneath the floor structure of the passenger vehicle and in other cases is suspended from the roof and above the ceiling of the vehicle. To meet the stringent requirements for space, service, and maintenance all of the major components such as the refrigerant, evaporator, heater, filters and blowers are enclosed in a single unit. This reduces the space requirements to a minimum and enables the entire apparatus to be quickly removed from the ceiling of the passenger compartment for repair or overhaul. It is in this general field of art to which the invention applies.

Prior art air conditioning apparatus has been employed in passenger vehicles. In many instances the major components such as evaporators, heaters and centrifugal blower units have been mounted from the roof structure of the veheicles. In most instances such components have been individually installed and physically separated one from another. Ducting was then constructed to interconnect the various components. Upon malfunction or failure, the various units would have to be separated from the ducting, removed from the vehicle, and thereafter bench tested for repairs. In other prior art arrangements such components have been installed in a large chamber necessitating the sealing of the enclosing roof structure against air leakage to prevent differential pressure losses. In addition, since the various units were physically separated large access panels in the ceiling were required in order to work on or repair the units, thus greatly complicatinng the sealing problems. A still further disadvantage of certain prior art constructions has been that in arrangements where dual opposing directions of conditioned air supply were required, U-shaped turn around ducting was employed.

It is an object of this invention therefore to provide an improved air conditioning apparatus for a railway passenger vehicle which avoids one or more of the disadvantages of the prior art installations and which has an improved efficiency.

It is another object of this invention therefore to provide an improved air conditioning apparatus for a railway vehicle wherein the evaporator, heater coils, blower mechanism, mixing chamber, return air intake, fresh air intake, are all combined in a single unit to minimize space requirements and to facilitate installation and servicing.

In accordance with the invention, overhead air conditioning apparatus is provided in a railway passenger vehicle which includes a roof, sidewalls, and floor structure defining a passenger compartment. Means are provided for conditioning air disposed beneath the roof of the vehicle, said air conditioning means including filter means, evaporator means, heater means, and blower means for drawing air through and discharging the same through opposite sides of said air conditioning means. First and second ducting means and associated with the opposite sides of said air conditioning means distribute conditioned air in two opposite directions to the passenger compartment.

For a better understanding of the present invention together with other and further objects thereof reference is had to the following description taken in connection with the accompanying drawing and its scope will be pointed out in the appended claim.

In the drawing, FIG. 1 is a three-quarter elevational view partially schematic of a complete air conditioning apparatus embodied in a railway passenger vehicle;

FIG. 2 is a plan view of the apparatus illustrated in FIG. 1;

FIG. 3 is a greatly enlarged portion of the apparatus, partially schematic of that shown in FIG. 2;

FIG. 4 is a sectional view taken along the line 4—4 of FIG. 3;

FIG. 5 is a sectional view taken along the line 5—5 of FIG. 3.

Referring to FIG. 1 of the drawing there is shown a railway passenger vehicle, partly schematic, incorporating the air conditioning apparatus of the present invention. The railway vehicle 10 includes a roof structure 11, side frames 12, 13, a floor structure 14 and a drop ceiling 15 to define a passenger carrying compartment 17. The railcar 10 includes door openings 19 and 20 in the side frame adjacent opposite ends of the car for simplicity of illustration. The major portion of the center portion of the car has been omitted for clarity of illustration.

In accordance with the invention novel air conditioning apparatus 25 is disposed beneath the roof structure and above the ceiling 16 of the car. The apparatus includes a pair of major air conditioning units or assemblies 27, 27a, and first and second ducting means 28, 92 extending from opposite ends of the assembly. Unit 27 functions in one end of the car, while unit 27a functions in the other end. Since both units are essentially identical only unit 27 will be discussed in detail. Fresh air ducting means 31 are ached to conform to the inner curved surfaces of the roof structure 11. The opposite ends of the duct merge with fresh air apertures 33, 35 which extend through the roof. A mixing chamber 32 is supported directly beneath and communicates with the duct 31. The air which is drawn in the opening 33 and 35 travels inwardly of the duct and drops down to the chamber. Any fine snow or heavy dust particles are caused to drop out in the chamber 32. The air is turned and drawn from the chamber through fore and aft disposed duct 37 which communicates with the major air conditioning assembly 27.

Referring now to FIGS. 3, 4, and 5, it is seen that the unitary assembly 27 includes a plenum chamber 39 which serves to mix the return air from the interior of the passenger compartment with the fresh air drawn through the fresh air duct 31, filter units 41, and evaporator unit 43 and an electric heater unit 45 which may be of conventional two-stage construction, and a motor blower unit 47 which closes the ends of the air conditioning assembly 27. The aforementioned blower unit is effective to draw fresh air and return air from the interior of the car through the filter, evaporator and heat units which are in line one with another. The entire air conditioner assembly 27 may be of low silhouette construction to enable it to be installed between the roof and ceiling of the passenger vehicle. The assembly 27 is structurally supported to the roof by said channel members 49, 50, and end member 51. The motor blower unit 47 includes a centrally disposed motor M and a pair of back-to-back centrifugal fans 52 and 53, driven by belts 54, 55 respectively. The motor and fans are supported in a chamber having a top wall 56, side walls 57, 58, end wall 59 and bottom wall 60. The centrifugal fans each consist of a wheel which is rotated within a housing adjacent to its axis. Air is caused to flow radially outwardly and is discharged into the aforementioned ducts 28, 29.

The housing of the centrifugal fan 52 communicates with a flexible duct 63 which in turn is connected to transverse duct means 64 of the aforementioned first duct means 28. The duct means 64 are disposed transverse to the longitudinal axis of the vehicle and have longitudinal branches 65 and 66 connected at its opposite ends. Air which has been discharged into flexible duct 63 is split by vane 67. Some of the air is thus moved in one direction along transverse duct 64 to enter longitudinal branch 65 while the remainder goes in an opposite direction and enters longitudinal branch 66. In a similar manner the air which is drawn into centrifugal fan unit 53 is discharged through flexible duct means 68 which in turn communicates with the aforementioned second duct means 29 which extends in an opposite direction travelling toward the center portion of the car.

With reference to FIG. 4, it is observed that the second duct means 29 include a top wall 70, first and second sidewalls 71, 72 and a bottom wall 73 connected to depending sidewall 71. The width of the bottom panel 73 of the duct is less than that of the top panel 70 to thereby define an opening 75 with depending sidewall 72. Conditioned air which has thus been discharged into duct means 29 is impelled to travel along the length of the duct. Depending upon the pressure built up by the centrifugal fan 53 a portion of the air is emitted through the opening 75 and through the ceiling segments 76, 77 and into the passenger compartment of the vehicle. The aforementioned branches 65, 66 of the first duct means likewise include longitudinal openings 78, 79 similar to opening 75 in ducting means 29 to thereby discharge air in a like manner.

Referring now to FIGS. 3 and 4, and considering the aforementioned fresh air duct means 31 in greater detail it is noted that the duct means are curved to conform to the carlins 81 of the roof 11. The ducting means 31 include a top wall 83 and a bottom wall 84 which communicates with the aforementioned settling chamber. This chamber includes sidewalls 86, 87, FIG. 3, an inclined end wall 88 and an opposite end wall 89 forming a portion of duct 37, FIG. 4, and a bottom wall 90. Thermostat means 91 are suitably mounted within the chamber. Air which is thus drawn into fresh air inlet openings 33 and 35 on the roof travels inboard along the duct and enters the settling chamber. Any snow, rain or heavy dust particles are thus first caused to be settled out prior to the air leaving the box structure 78 and being drawn into the aforementioned duct means 39. The latter duct means 39 communicate with the aforementioned plenum chamber 39 and is connected thereto by means of rubber gasket means indicated as at 93.

With reference now to FIG. 5, plenum chamber 39 includes a bottom wall 96 having an aperture grill-like panel 97 hinged thereto as at 98. Air which has thus been supplied to the center and end portions of the passenger compartment 17 may be turned around and drawn into chamber to mix with the fresh air supplied by duct 37 by the fans 52, 53 prior to being conditioned. It is thus noted that U-shaped turn-around ducts are not required to accomplish the turn-around function in the system.

While there has been described what at present is considered to be the preferred embodiment of this invention, it will be obvious to those skilled in the art that various changes and modifications may be made therein without departing from the invention, and it is, therefore, aimed in the appended claim to cover all such changes and modifications as fall within the true spirit of the invention.

What is claimed is:

1. Air conditioning apparatus for a rail passenger vehicle having a roof, ceiling, sidewalls, and floor defining a passenger compartment, comprising in combination, means for conditioning air supported from the roof of said vehicle, said air conditioning means including a mixing chamber provided with fresh air and return air inlets, filter means, evaporator means, heater means, said filter means, evaporator means, and heater means being disposed in in-line arrangement, blower means downstream of said air conditioning means for drawing air therethrough, said air conditioning means and said blower means being housed in a common casing, first and second ducting means connected to opposite ends of said casing and running longitudinally of said vehicle, said blower means being interposed between said first and second ducting means to distribute conditioned air in two opposite directions through said first and second ducting means, said first and second ducting means including spaced openings to discharge conditioned air to said passenger compartment.

References Cited

UNITED STATES PATENTS

| | | | |
|---|---|---|---|
| 1,853,459 | 4/1932 | Russell et al. | 165—42 |
| 1,989,997 | 2/1935 | Morse et al. | 165—42 |
| 2,053,395 | 9/1936 | Dodge | 165—42 |
| 2,149,382 | 3/1939 | Anderson | 98—10 |
| 2,201,765 | 5/1940 | Euwer | 165—16 |
| 2,661,676 | 12/1953 | Farr et al. | 98—10 |

ROBERT A. O'LEARY, Primary Examiner

C. SUKALO, Assistant Examiner

U.S. Cl. X.R.

98—10